United States Patent
Iwai

(10) Patent No.: US 10,254,972 B2
(45) Date of Patent: Apr. 9, 2019

(54) STORAGE DEVICE AND STORAGE SYSTEM

(71) Applicant: Toshiba Memory Corporation, Minato-ku (JP)

(72) Inventor: Daisuke Iwai, Yokohama (JP)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 0 days.

(21) Appl. No.: 15/453,016

(22) Filed: Mar. 8, 2017

(65) Prior Publication Data

US 2018/0074722 A1  Mar. 15, 2018

Related U.S. Application Data

(60) Provisional application No. 62/393,880, filed on Sep. 13, 2016.

(51) Int. Cl.
*G06F 3/06* (2006.01)
*G06F 12/02* (2006.01)
*G06F 21/00* (2013.01)
*G06F 12/14* (2006.01)

(52) U.S. Cl.
CPC .......... *G06F 3/0611* (2013.01); *G06F 3/0634* (2013.01); *G06F 3/0655* (2013.01); *G06F 3/0679* (2013.01); *G06F 12/0246* (2013.01); *G06F 21/00* (2013.01); *G06F 12/1433* (2013.01); *G06F 2212/1016* (2013.01); *G06F 2212/1044* (2013.01); *G06F 2212/1052* (2013.01); *G06F 2212/7201* (2013.01)

(58) Field of Classification Search
CPC .... G06F 3/0611; G06F 3/0679; G06F 3/0634; G06F 3/0655; G06F 12/1018; G06F 9/4418

USPC ........................................................ 711/103
See application file for complete search history.

(56) References Cited

U.S. PATENT DOCUMENTS

| | | | |
|---|---|---|---|
| 8,782,804 B2 | 7/2014 | Nagai et al. | |
| 9,852,298 B2 * | 12/2017 | Jeansonne | G06F 21/575 |
| 2007/0083767 A1 * | 4/2007 | Kumamoto | G06F 21/64 |
| | | | 713/189 |
| 2009/0287901 A1 * | 11/2009 | Abali | G06F 12/1018 |
| | | | 711/206 |

(Continued)

FOREIGN PATENT DOCUMENTS

| | | |
|---|---|---|
| JP | 2013-168895 | 8/2013 |
| JP | 5624510 | 11/2014 |

OTHER PUBLICATIONS

"NVM Express revision 1.2a specification," Incorporates ECNs 001-005., http://nvmexpress.org, Oct. 2015, pp. 209.

*Primary Examiner* — Hua J Song
(74) *Attorney, Agent, or Firm* — Oblon, McClelland, Maier & Neustadt, L.L.P.

(57) ABSTRACT

According to one embodiment, a storage device includes a nonvolatile memory storing first data, and a device controller which is capable of storing all or a part of the first data stored in the nonvolatile memory as second data to a memory area in a host. The device controller which is configured to calculate a first hash value of the second data stored in the memory area in a first timing, calculate a second hash value of the second data stored in the memory area in a second timing, and detect whether the second data stored in the memory area is tampered between the first and second timings by comparing the second hash value with the first hash value.

20 Claims, 11 Drawing Sheets

(56) References Cited

U.S. PATENT DOCUMENTS

2010/0058073 A1  3/2010  Ng et al.

* cited by examiner

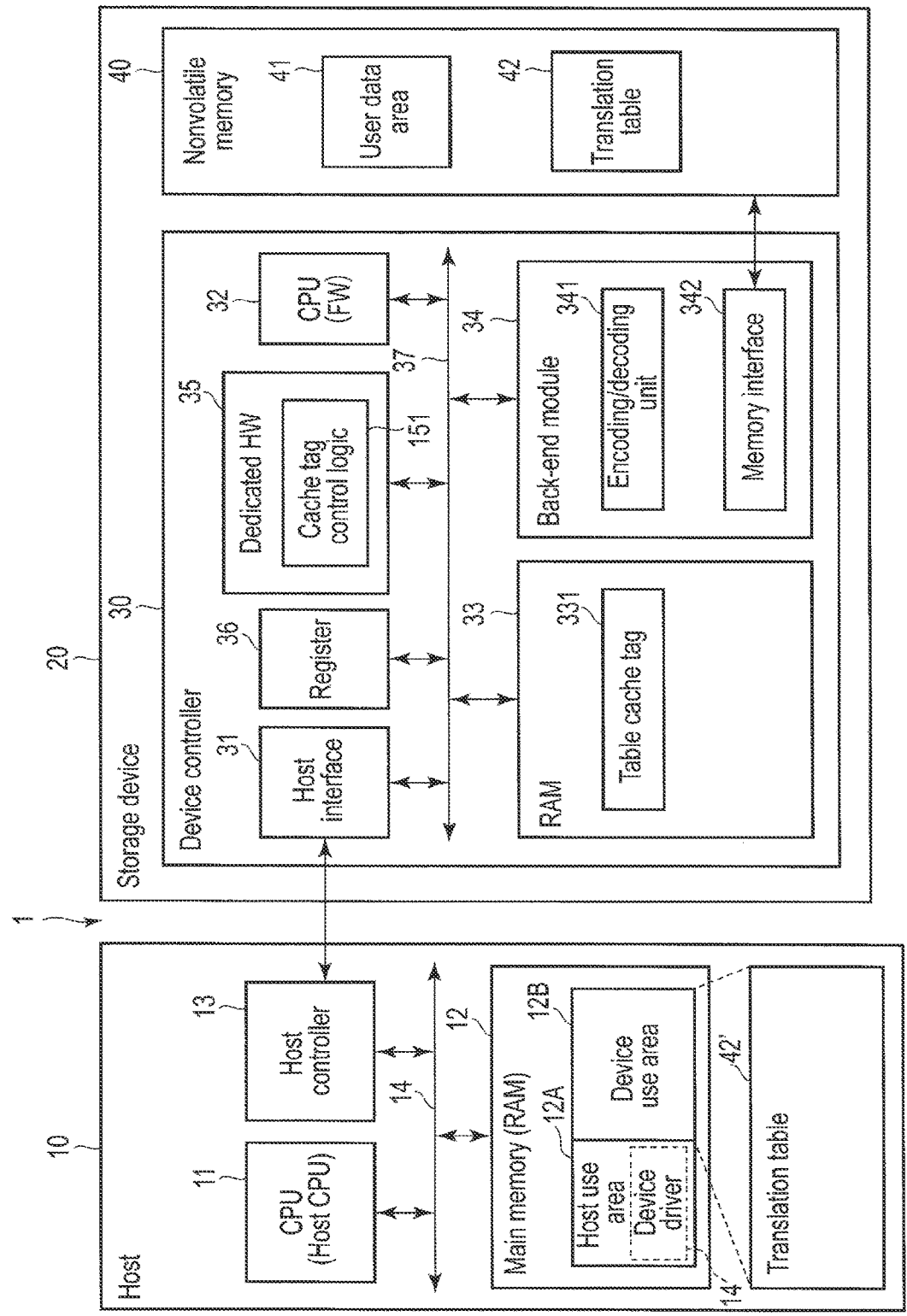
F I G. 1

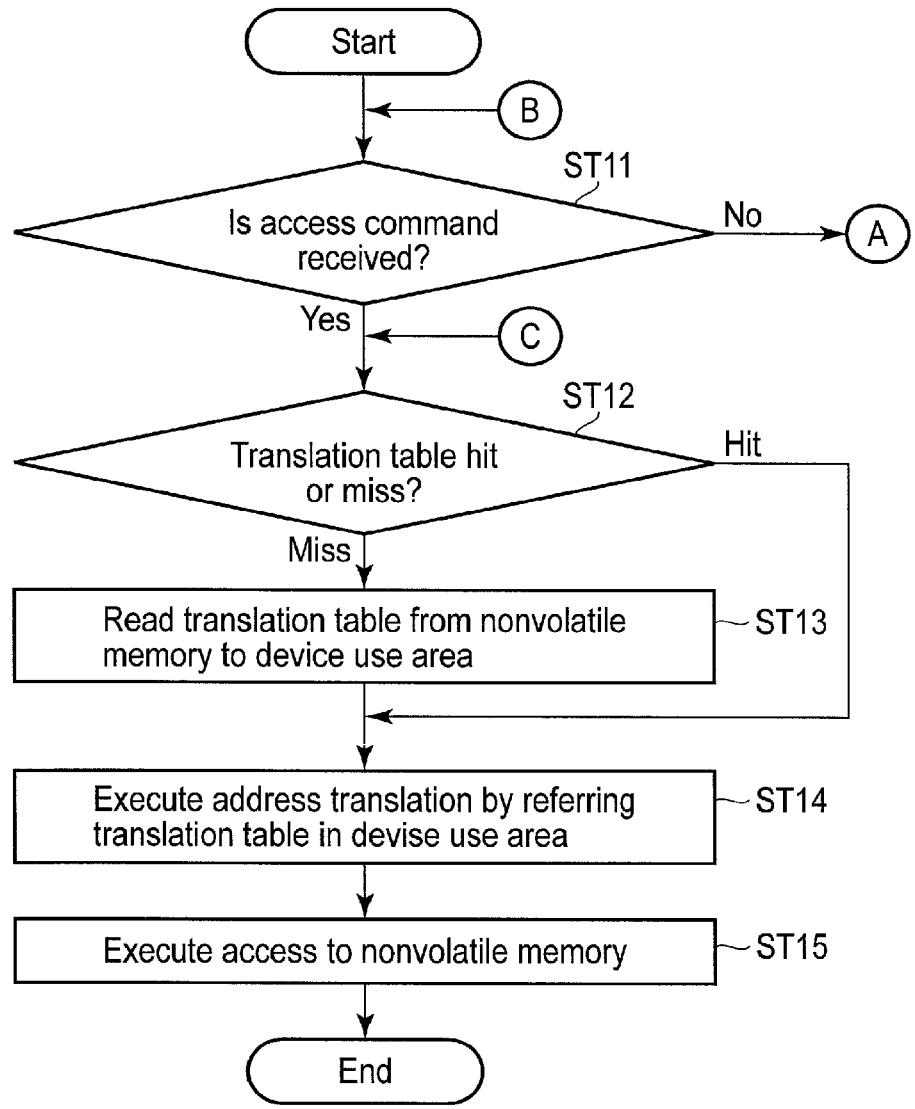
F I G. 5A

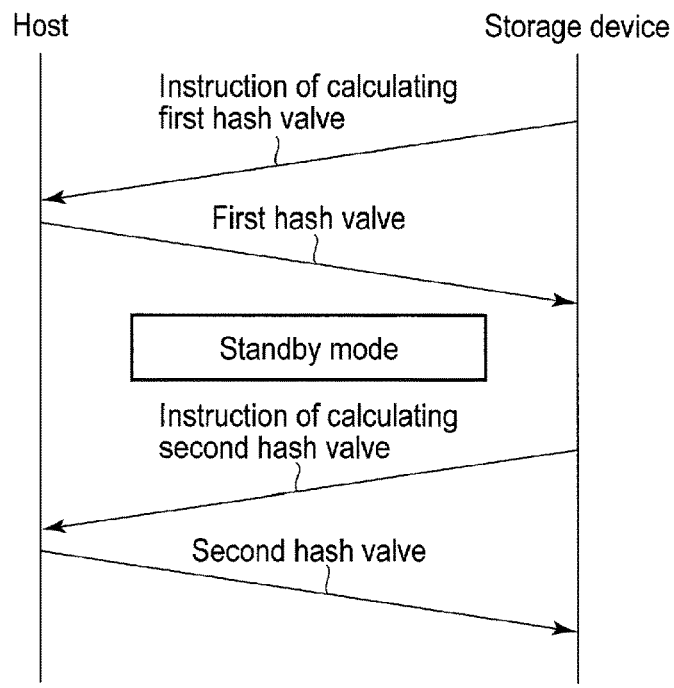
F I G. 6
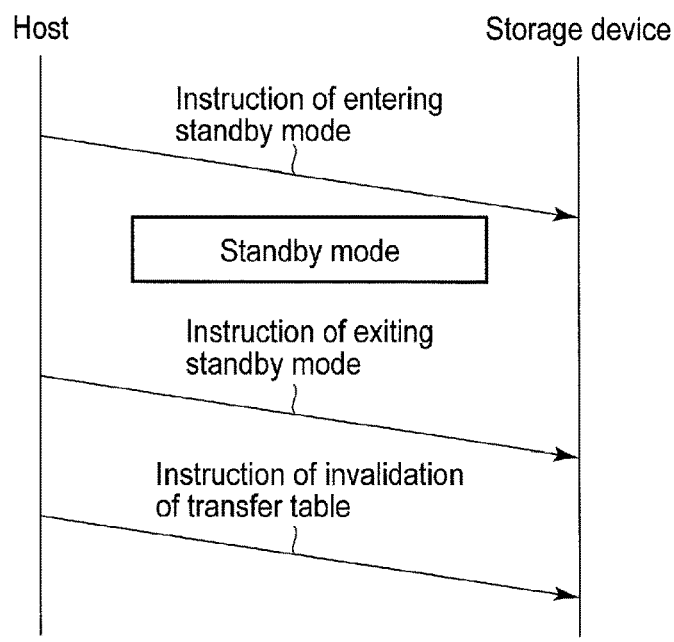
F I G. 9

STORAGE DEVICE AND STORAGE SYSTEM

CROSS-REFERENCE TO RELATED APPLICATIONS

This application claims the benefit of U.S. Provisional Application No. 62/393,880, filed Sep. 13, 2016, the entire contents of which are incorporated herein by reference.

FIELD

Embodiments described herein relate generally to a storage device and a storage system.

BACKGROUND

A Unified Memory Architecture (UMA) which is a memory architecture in which a host and a storage device use a memory incorporated in the host is known. In a storage system to which the UMA is applied, the storage device serving as an external storage device of the host uses part of the memory incorporated in the host.

BRIEF DESCRIPTION OF THE DRAWINGS

FIG. 1 is a view showing a storage system according to an example.

FIG. 5A and FIG. 5B are views showing a second application example.

FIG. 6 is a view showing communication between a host and a device in the second application example.

FIG. 9 is a view showing communication between a host and a device in the third application example.

DETAILED DESCRIPTION

Figure 2:
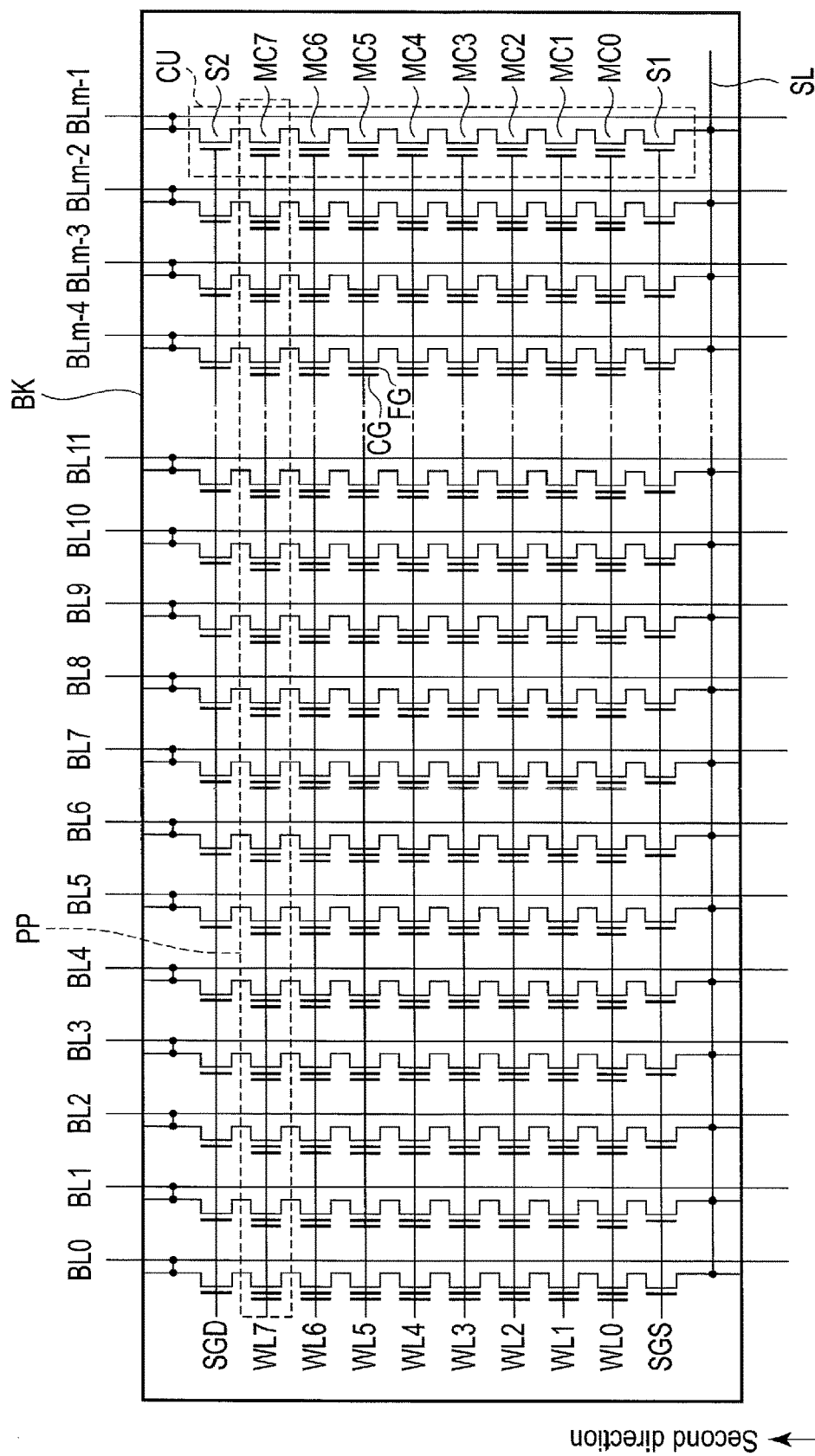
FIG. 2 is a view showing an example of a nonvolatile memory.

In general, according to one embodiment, a storage device comprises: a nonvolatile memory storing first data; and a device controller which is capable of storing all or a part of the first data stored in the nonvolatile memory as second data to a memory area in a host. The device controller which is configured to: calculate a first hash value of the second data stored in the memory area in a first timing, calculate a second hash value of the second data stored in the memory area in a second timing, and detect whether the second data stored in the memory area is tampered between the first and second timings by comparing the second hash value with the first hash value.

(Embodiment)

FIG. 1 shows a storage system according to an example.

The storage system includes a host 10, and a storage device 20 controlled by the host 10.

The host 10 is an electronic device such as a personal computer, portable terminal, and the like. The host 10 may be an imaging device such as a digital still camera, video camera, and the like, and may also be a tablet computer, smartphone, game machine, car navigation system, printer device, scanner device, server system, and the like.

The storage device 20 is a device connectable to the host 10 such as a solid state drive (SSD), USB memory, and the like. The storage device 20 may be incorporated in the host 10 or may be connected to the host 10 through a cable or a network.

The host 10 and the storage device 20 are connected to each other in accordance with a predetermined interface standard. The predetermined interface standard is, for example, the Peripheral Component Interconnect express (PCIe) standard having its own characteristics such as broadband, low latency, high extensibility, and the like or the Non-Volatile Memory express (NVMe) standard serving as a standard handling a nonvolatile memory (storage memory) on an interface conforming to the PCIe standard.

The predetermined interface standard may also be the Serial Advanced Technology Attachment (SATA) standard, Universal Serial Bus (USB) standard, Serial Attached SCSI (SAS) standard, Mobile Industry Processor Interface (MIPI) standard, Unified Protocol (UniPro) standard, Universal Flash Storage (UFS) standard, and the like.

The host 10 includes a CPU (host CPU) 11, main memory 12, host controller 13, and bus 14 connecting these components to each other.

The CPU 11 is a processor configured to control the components in the host 10. The CPU 11 executes, for example, a program to be loaded from the storage device 20 into the main memory 12. This program includes, for example, an operating system, file system, application program, and the like.

The main memory 12 is, for example, a random access memory. The main memory 12 may be a volatile memory such as a dynamic random access memory (DRAM), and the like or may be a nonvolatile memory such as a magnetic random access memory (MRAM), ferroelectric random access memory (FeRAM), and the like.

The main memory 12 includes a host use area 12A, and device use area 12B. The host use area 12A is used as, for example, a program expansion area at the time when the host 10 executes the operating system (OS) or the user program or as a working area at the time when the host 10 executes the program expanded on the program expansion area.

The device use area 12B is an area which can be used by the storage device 20, and is sometimes referred to as a host memory buffer. The size (memory capacity) and range of the device use area 12B can be specified by, for example, the host 10.

The size of the device use area 12B is greater than the size (memory capacity) of the RAM 33 in the storage device 20. Accordingly, the storage device 20 can store, for example, a translation table 42 indicating relationships between logical addresses and physical addresses in the device use area 12B as cache data. Here, the logical address implies an address managed by the host 10, and the physical address implies an address of a nonvolatile memory 40.

In this case, the following advantages can be obtained.

Firstly, cost reduction of the storage device 20 can be realized.

In recent years, the memory capacity of the nonvolatile memory 40 in the storage device 20 has been largely increased by the 3D technology of the memory cell array, and the size (memory capacity) of the user data area 41 has also been increased. In accordance with this, the size (memory capacity necessary for storing the translation table 42) of the translation table 42 configured to translate a logical address into a physical address at the time of access to the nonvolatile memory 40 has also been increased.

On the other hand, in order to carry out a read/write operation at a high speed, it is necessary to carry out the translation from a logical address into a physical address at a high speed and, for that purpose, it becomes important to read the translation table 42 in advance as cache data into, for example, the RAM 33 in the storage device 20. However, as described above, the size of the translation table 42 is large, and hence in order to store the translation table 42 in its entirety in the RAM 33, the RAM 33 having a large size (memory capacity) is required. This implies an increase in cost of the storage device 20.

Then, by storing all or part of the translation table 42 in the device use area 12B having a size greater than the size of the RAM 33 as a cache translation table (cache data) 42', it is possible to read all or part of the translation table 42 from the device use area 12B without increasing the size of the RAM 33 in the storage device 20. Thereby, it is possible to realize cost reduction of the storage device 20.

Secondly, the access performance in the storage device 20 can be improved.

When the translation table 42 is to be stored in the RAM 33 in the storage device 20 as cache data, the size of the translation table which can be read into the RAM 33 as cache data is limited. That is, part of the translation table 42 is stored in the RAM 33 as cache data. This operation is carried out for the purpose of improving the access performance without increasing the size of the RAM 33.

In this case, there is sometimes a case where the access speed is lowered depending on the cache hit ratio in the RAM 33. Further, for example, when a cache miss occurs, first the translation table 42 should be read from the nonvolatile memory 40, thereafter address translation from a logical address into a physical address should be carried out and, thereafter an actual access operation should be started. This implies that the performance of access to the nonvolatile memory 40 is deteriorated, i.e., that the access speed is lowered.

Then, by storing the translation table 42 in the device use area 12B having a size greater than the size of the RAM 33, the limit to the size of the translation table which can be read into the device use area 12B is annulled. For example, it is also possible to store the translation table 42 in its entirety in the device use area 12B as a cache translation table 42'. Thereby, it is possible to improve the cache hit ratio, and improve the access performance in the storage device 20.

Incidentally, there is apprehension caused by the storage device 20 storing predetermined information, for example, the translation table or the like in the main memory 12 (device use area 12B) in the host 10 as described above. This implies apprehension that the host 10 might intentionally tamper the data in the device use area 12B.

The device use area 12B is a storage area assigned to the storage device 20, and hence it is desirable that primarily only the storage device 20 be able to carry out a data read/write operation. However, the device use area 12B is only a storage area in the main memory 12 in the host 10. Accordingly, it is possible for the host 10 to intentionally tamper the data in the device use area 12B.

Then, the storage device 20 verifies whether or not all or part of the device use area 12B has been tampered by the host 10 by using a hash value (message digest). Here, the hash value implies a value obtained by translating data of all or part of the device use area 12B by using the so-called hash function.

On the basis of the fact that no identical hash values are created from different data items, by calculating a hash value of all or part of the device use area 12B at each of first timing and second timing, and by comparing the hash value calculated at the first timing and the hash value calculated at the second timing with each other, it is possible to verify whether or not all or part of the device use area 12B has been tampered by the host 10 between the first timing and the second timing.

Upon determination that all or part of the device use area 12B has been tampered by the host 10, the storage device 20 invalidates all or part of the device use area 12B regarded as having been tampered. In this case, the invalidated predetermined information, for example, the translation table 42 is read again from the storage device 20 into the device use area 12B. This will be described later.

The mainstay configured to create the hash value may be the host 10 or may also be the storage device 20. Further, the place configured to store therein the hash values may be a memory in the host 10, for example, the host use area (management area of the device driver 14) 12A or may also be a memory in the storage device 20, for example, a register (always power-on area) 36.

For example, when the CPU (host CPU) 11 is to calculate a hash value, it is desirable that the hash value be stored in the host use area (management area of the device driver 14) 12A. Further, when the storage device 20 is to calculate a hash value, it is desirable that the hash value be stored in the register 36.

The host controller 13 is a controller configured to carry out data communication between the host 10 and storage device 20. The host controller 13 issues a write command or a read command to the storage device 20 on the basis of, for example, a file system. Further, the host controller 13 receives a read/write request requesting read/write of data in the device use area 12B from the storage device 20.

The storage device 20 includes a device controller 30, and nonvolatile memory 40. The nonvolatile memory 40 is a storage memory which can be largely increased in capacity, for example, a NAND flash memory. The nonvolatile memory 40 may include a memory cell array having a two-dimensional structure or may include a memory cell array having a three-dimensional structure. The nonvolatile memory 40 may include a plurality of stacked memory chips.

The nonvolatile memory 40 includes a user data area 41 configured to store therein user data. Further, the nonvolatile memory 40 stores therein the translation table 42 indicating relationships between logical addresses and physical addresses.

The nonvolatile memory 40 includes a block BK as shown in, for example, FIG. 2.

The block BK includes a plurality of cell units arranged in a first direction. One cell unit CU includes a memory cell string extending in a second direction intersecting the first direction, transistor (field effect transistor: FET) S1 connected to one end of a current pathway of the memory cell string, and transistor (FET) S2 connected to the other end of the current pathway of the memory cell string. The memory cell string has eight memory cells MC0 to MC7 current pathways of which are connected in series.

One memory cell MCk (k is one of numbers 0 to 7) includes a charge storage layer (for example, a floating gate electrode) FG, and control gate electrode CG.

In this example, although one cell unit CU includes eight memory cells MC0 to MC7, the number of the memory cells is not limited to this. For example, one cell unit CU may include two or more memory cells, for example, thirty-two, fifty-six or more memory cells. Further, each memory cell may be a single level cell (SLC) capable of storing therein one bit or may be a multi-level cell (MLC) capable of storing therein two or more bits.

A source line SL is connected to the one end of the current pathway of the memory cell string through the selection transistor S1. A bit line BLm−1 is connected to the other end of the current pathway of the memory cell string through the selection transistor S2.

Each of word lines WL0 to WL7 is connected to control gate electrodes CG of a plurality of memory cells MC0 to MC7 arranged in the first direction as a common connection. Likewise, a select gate line SGS is connected to gate electrodes of a plurality of selection transistors S1 arranged in the first direction as a common connection, and a select gate line SGD is connected to gate electrodes of a plurality of selection transistors S2 arranged in the first direction as a common connection.

One page PP includes m memory cells connected to one word line WLi (i is one of numbers 0 to 7). A read/write operation of the nonvolatile memory 40 is carried out in units of pages PP (corresponding to clusters), and an erase operation is carried out in units of blocks BK.

The device controller 30 controls the nonvolatile memory 40. The device controller 30 functions as, for example, a translation layer configured to execute data management and block management of the nonvolatile memory 40.

The data management includes management of the translation table 42. The block management includes management of bad blocks, management of wear leveling, management of garbage collection, and the like.

The nonvolatile memory 40 such as a NAND flash memory and the like has a feature that it cannot carry out an overwrite operation of data. Accordingly, when data of a first physical address is to be changed, data is written to a second physical address, and then the data of the first physical address is invalidated. Owing to such a feature, the above-mentioned data management and block management become important.

The device controller 30 reads all or part of the translation table 42 from the nonvolatile memory 40, and transfers the read resultant to the host 10 through a host interface 31. In accordance with an instruction from the device controller 30, the host controller 13 stores all or part of the translation table 42 in the device use area 12B as a cache translation table (cache data) 42'. The procedure by which the device controller 30 executes a read/write operation of the device use area 12B conforms to a standard such as the Universal Flash Storage Unified Memory Extension or the like.

The device controller 30 includes, for example, a host interface 31, CPU 32, RAM 33, back-end module 34, dedicated hardware 35, register 36, and bus 37 configured to connect these components to each other.

The host interface 31 receives various commands such as a read/write command, and the like from the host 10. Further, the host interface 31 can transmit a command (read/write command or the like) used to access the device use area 12B to the host 10.

The CPU 32 controls, for example, whether the storage device 20 should be in the operation mode or in the standby mode.

For example, when no access command is issued from the host 10 to the storage device 20 for a predetermined period of time, the CPU 32 changes the mode of the storage device 20 from the operation mode to the standby mode according to an instruction from the host 10 or according to the CPU 32's own determination. Further, when an access command is issued from the host 10 to the storage device 20 in the standby mode, the CPU 32 changes the mode of the storage device 20 from the standby mode to the operation mode according to an instruction from the host 10 or according to the CPU 32's own determination.

Here, the operation mode implies a state where a power supply voltage is supplied to the device controller 30 and nonvolatile memory 40, and access (read/write operation) to the nonvolatile memory 40 is enabled. Further, the standby mode implies a state where a power supply voltage is supplied to only part of the device controller 30, and access (read/write operation) to the nonvolatile memory 40 is disabled.

For example, in the storage device 20, a power supply voltage is supplied to a minimum necessary number of components, for example, the CPU 32 and register 36 in the standby mode, and the power supply voltage is not supplied to the RAM 33, back-end module 34, dedicated hardware 35, nonvolatile memory 40, and the like. Thereby, power saving for low power consumption of the storage system is contrived.

When the mode of the storage device 20 is to be changed from the operation mode to the standby mode (first timing), the CPU 32 calculates a hash value by itself with respect to all or part of the device use area 12B as described previously, or instructs the host 10 to obtain a hash value of all or part of the device use area 12B. The hash value is stored in the host use area (management area of the device driver 14) 12A or in the register (always power-on area) 36.

Further, when the mode of the storage device 20 is to be changed from the standby mode to the operation mode (second timing), the CPU 32 reads a control program (firmware FW) stored in a ROM into the RAM 33, and executes predetermined processing.

For example, the CPU 32 calculates a hash value again by itself with respect to all or part of the device use area 12B, or instructs the host 10 to obtain a hash value of all or part of the device use area 12B. The CPU 32 compares the hash value obtained at the second timing with the hash value obtained at the first timing.

When both the hash values are identical to each other, the CPU 32 determines that all or part of the device use area 12B has not been tampered by the host 10, and certifies that the data of the device use area 12B at the time before the storage device 20 has entered the standby mode is valid.

On the other hand, when both the hash values are different from each other, the CPU 32 determines that all or part of the device use area 12B has been tampered by the host 10, and invalidates the data of the device use area 12B at the time before the storage device 20 has entered the standby mode. In this case, the CPU 32 reads the invalidated predetermined information, for example, the translation table 42 again from the nonvolatile memory 40 into the device use area 12B.

The above is an example in which the storage device 20 determines whether or not the device use area 12B has been tampered by the host 10 in the period during which the storage device 20 is in the standby mode. The reason why the tampering in the standby mode is taken as the subject in this way is that in the standby mode, no read/write operation of the nonvolatile memory 40 is carried as described above, and hence it is premised that the predetermined information in the device use area 12B, for example, the translation table 42 does not change throughout the period straddling the standby mode.

Conversely, when the storage device 20 is in the operation mode, the read/write operation of the nonvolatile memory 40 is frequently carried out. This is because, in this case, the predetermined information in the device use area 12B, for example, the translation table 42 is changed or updated at all times, and hence it is difficult to determine whether or not the device use area 12B has been tampered by the host 10.

It should be notified that although the comparison between the hash values, and the determination about the tampering are carried out by the CPU 32 in the storage device 20, instead of the above, the comparison and the determination may also be carried out by, for example, the CPU 11 in the host 10. In this case, the hash values before and after the standby mode are calculated and compared with each other by the CPU 11. The hash value obtained before the standby mode is stored in, for example, the host use area 12A.

Further, when both the hash values are different from each other, the CPU 11 determines that all or part of the device use area 12B has been tampered by the host 10, and notifies the storage device 20 that the data of the device use area 12B at the time before the storage device 20 has entered the standby mode is invalid. In this case, the CPU 32 in the storage device 20 invalidates the data of the device use area 12B, and reads the invalidated predetermined information, for example, the translation table 42 again from the nonvolatile memory 40 into the device use area 12B in the host 10.

The operation of the CPU 32 is controlled by the firmware FW. However, part or all of the operation of the CPU 32 may also be executed by the dedicated hardware 35.

The RAM 33 is the device-incorporated RAM provided in the storage device 20. Although the RAM 33 is provided in the device controller 30, instead of the above, the RAM 33 may also be provided independently of the device controller 30. The RAM 33 is, for example, a volatile RAM such as a dynamic RAM (DRAM), static RAM (SRAM), and the like. The RAM 33 is used as a work area of the CPU 32, and a loaded control program, various tables, and the like are stored therein.

The RAM 33 stores therein, for example, a table cache tag 331. The table cache tag 331 is, for example, tag information used to manage a cache translation table 42' stored in the device use area 12B. That is, the table cache tag 331 is used for a hit/miss determination whether or not the cache translation table 42' configured to translate a logical address into a physical address at the time of access to the nonvolatile memory 40 exists in the device use area 12B.

It is desirable that the table cache tag 331 be stored not in the device use area 12B but in the RAM 33 in the device controller 30 as described above. This is because in this case, the CPU 32 can immediately carry out the above-mentioned hit/miss determination without accessing the device use area 12B.

The back-end module 34 includes an encoding/decoding unit 341, and memory interface 342. The encoding/decoding unit 341 includes, for example, an error correction code (ECC) encoder, and ECC decoder.

When writing data to the nonvolatile memory 40, the encoding/decoding unit 341 adds an error correction code (ECC) to the write data as a redundant code by encoding (ECC encoding) the write data. Further, when reading data from the nonvolatile memory 40, the encoding/decoding unit 341 carries out error correction of the read data (ECC decoding) by using the ECC added to the read data.

The memory interface 342 functions as an interface with the nonvolatile memory 40.

(Tamper-Proof Algorithm)

Figure 3:
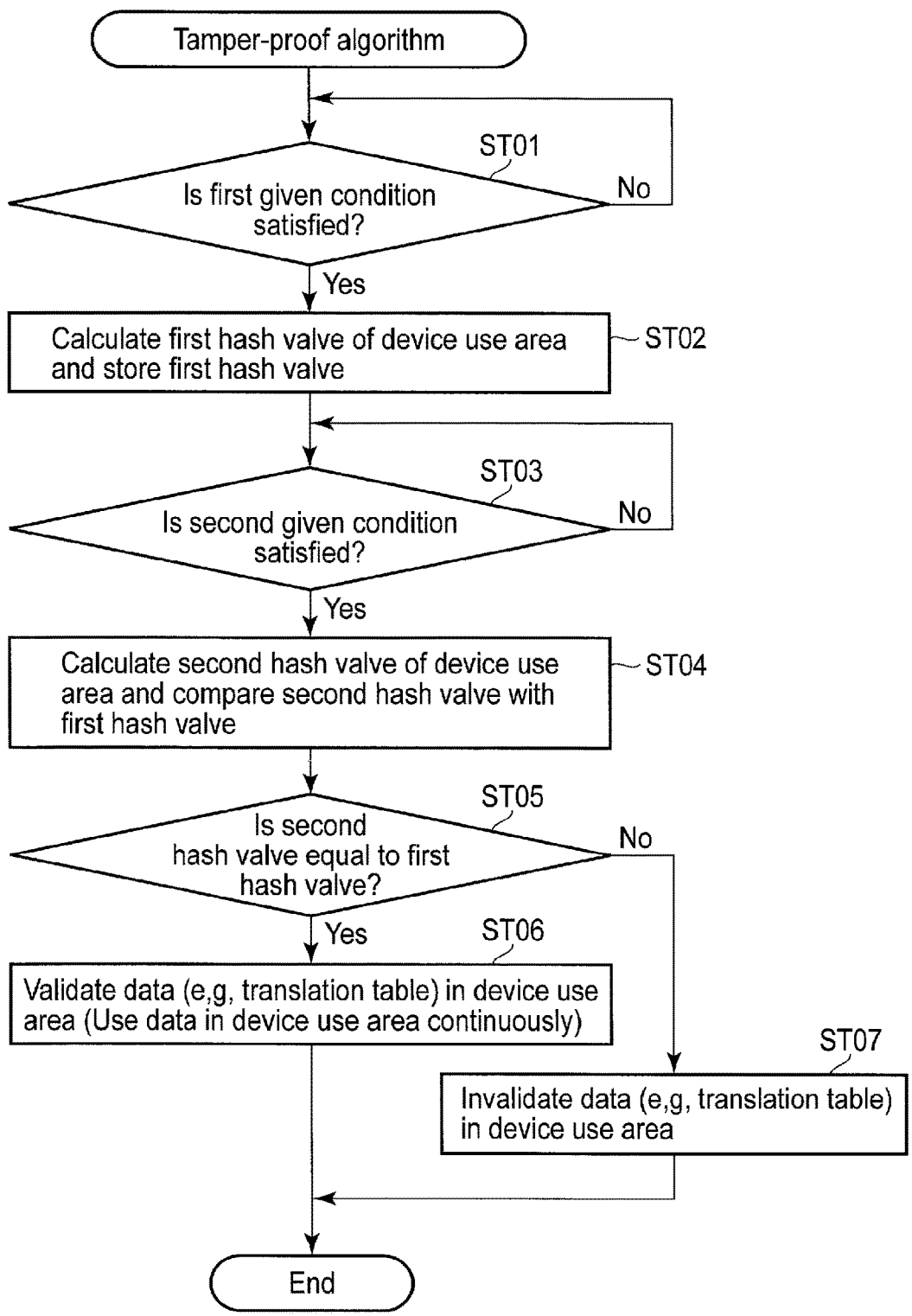
FIG. 3 is a flowchart showing a tamper-proof algorithm.

FIG. 3 shows a tamper-proof algorithm.

This algorithm is executed by a host or a storage device.

First, it is confirmed whether or not a first given condition is satisfied (step ST01). The first given condition is that for example, the storage device enters the standby mode or that a specific event occurs in the storage device, and so on. The mainstay configured to execute this step may be the host or may also be the storage device.

Next, when the first given condition is satisfied, a hash value (first hash value) of all or part of the device use area in the host is calculated, and the first hash value is stored (step ST02). The mainstay configured to calculate the first hash value may be the host or may also be the storage device. Further, the place configured to store therein the first hash value may be a memory in the host or may also be a memory in the storage device.

Next, it is confirmed whether or not a second given condition is satisfied (step ST03). The second given condition is, for example, that the storage device exits from the standby mode or that a specific event occurs in the storage device, and so on. The mainstay configured to execute this step may be the host or may also be the storage device.

Next, when the second given condition is satisfied, a hash value (second hash value) of all or part of the device use area in the host is calculated and the second hash value is compared with the first hash value (step ST04). The mainstay configured to calculate the second hash value and the mainstay configured to compare the second hash value with the first hash value may be the host or may also be the storage device.

Next, it is confirmed whether or not the second hash value is identical to the first hash value (step ST05). The mainstay of this step may be the host or may also be the storage device.

When both the hash values are identical to each other, it is determined that all or part of the device use area has not been tampered, and it is certified that the data (for example, a look-up table: LUT) in the device use area at the time before the first timing at which the first given condition has been satisfied is valid. In this case, the data in the device use area at the time before the first timing is continuously used (step ST06).

On the other hand, when both the hash values are different from each other, it is determined that all or part of the device use area has been tampered, and the data in the device use area at the time before the first timing at which the first given condition has been satisfied is invalidated. In this case, the invalidated predetermined information is read again from the nonvolatile memory into the device use area (step ST07).

(Application Example)

Hereinafter, examples in which the above-mentioned algorithm is applied to prevention of tampering in the standby mode of the storage device will be described.

Figure 4A:
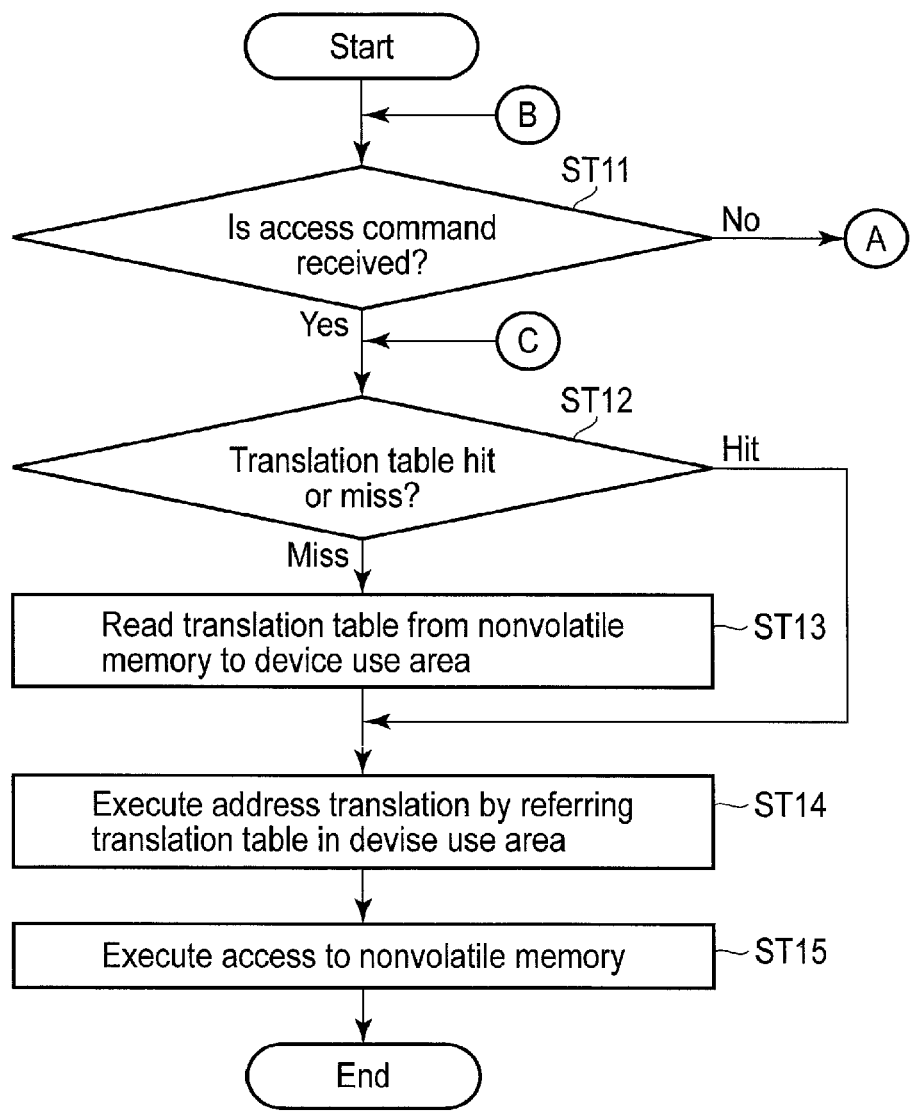
FIG. 4A and FIG. 4B are views showing a first application example.
Figure 4B:
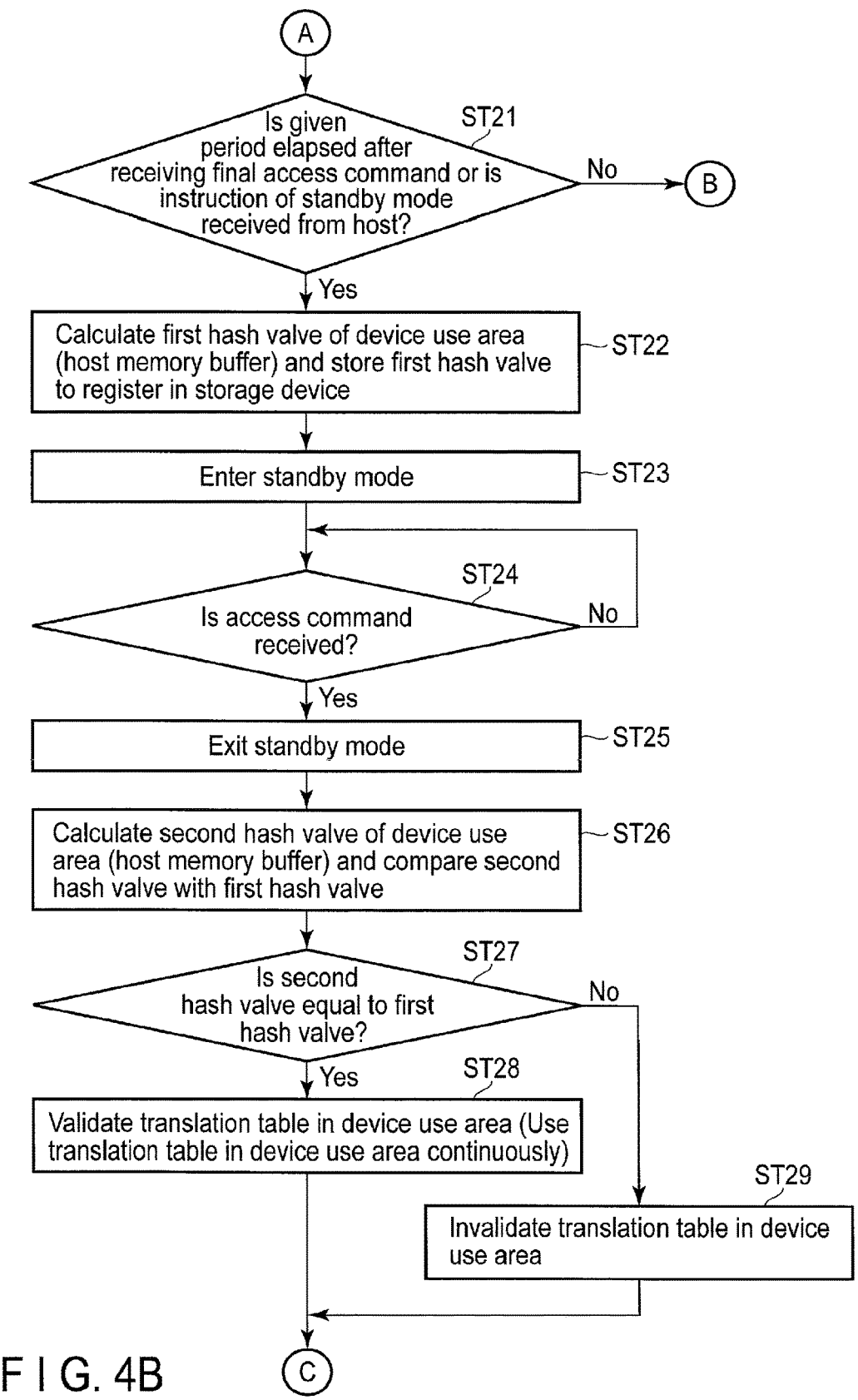

FIG. 4A and FIG. 4B show a first application example.

The first application example is an example in which a translation table indicating relationships between logical addresses and physical addresses is stored in a device use area in the host, and the storage device carries out calculation and storage of hash values to thereby verify whether or not the translation table in the device use area has been tampered.

First, an address translation algorithm will be described below.

The mainstay of this algorithm is, for example, the CPU 32 of FIG. 1.

Upon receipt of an access command (read/write command or the like), the CPU 32 carries out a determination whether or not the translation table is stored in the device use area, i.e., a hit/miss determination of the translation table (steps ST11 to ST12). This determination is carried out on the basis of, for example, the table cache tag 331 of FIG. 1.

When no translation table is stored in the device use area 12B, the CPU 32 carries out a miss determination, and reads the translation table from the nonvolatile memory into the device use area. Thereafter, the CPU 32 refers to the translation table in the device use area to thereby execute address translation (translation from a logical address into a physical address) (step ST12→ST13→ST14).

Further, when the translation table is stored in the device use area, the CPU 32 carries out a hit determination, and refers to the translation table in the device use area to thereby immediately execute address translation (translation from a logical address into a physical address) (step ST12→ST14).

The CPU 32 executes the address translation, and thereafter executes access to the nonvolatile memory (step ST15).

When the CPU 32 receives no access command in this address translation algorithm, the CPU 32 executes a tamper-proof algorithm at predetermined timing.

For example, when a given condition is satisfied, the CPU 32 calculates a hash value (first hash value) of all or part of the device use area in the host, and stores the first hash value in, for example, a register in the storage device (steps ST21 to ST22). Here, the given condition is that a final access command from the host to the storage device has been received, and thereafter a predetermined period of time has elapsed or that an instruction concerning the standby mode has been received from the host, and so on.

The CPU 32 carries out calculation and storage of the first hash value, and thereafter causes the storage device to enter the standby mode (step ST23). In the standby mode, a power supply voltage is supplied to only a minimum necessary number of components. Further, when the storage device has a low power consumption mode changing in multiple steps, the standby mode can also be replaced with one of these multiple steps.

Thereafter, upon receipt of, for example, an access command from the host, the CPU 32 causes the storage device to exit from the standby mode (steps ST24 to ST25).

Further, the CPU 32 calculates a hash value (second hash value) of all or part of the device use area in the host, and compares the second hash value with the first hash value (step ST26).

When the first and second hash values are identical to each other, the CPU 32 determines that all or part of the device use area has not been tampered, and certifies that the translation table in the device use area at the time before the storage device has entered the standby mode is valid. In this case, the translation table in the device use area at the time before the storage device has entered the standby mode is continuously used (step ST27→ST28).

On the other hand, when the first and second hash values are different from each other, the CPU 32 determines that all or part of the device use area has been tampered, and invalidates the translation table in the device use area at the time before the storage device has entered the standby mode. In this case, the translation table is read from the nonvolatile memory into the device use area (step ST27→ST29).

After the above tamper-proof algorithm is executed, the flow returns to the address translation algorithm.

According to the first application example, the storage device manages the hash values, whereby it is possible to verify the tampering of the translation table of the device use area in the host. It should be noted that when the storage device is a low-end product, it is conceivable that the storage device frequently enters the standby mode. It is remarkably effective to detect tampering of data, and protect the data under such circumstances without an increase in cost.

Figure 5B:
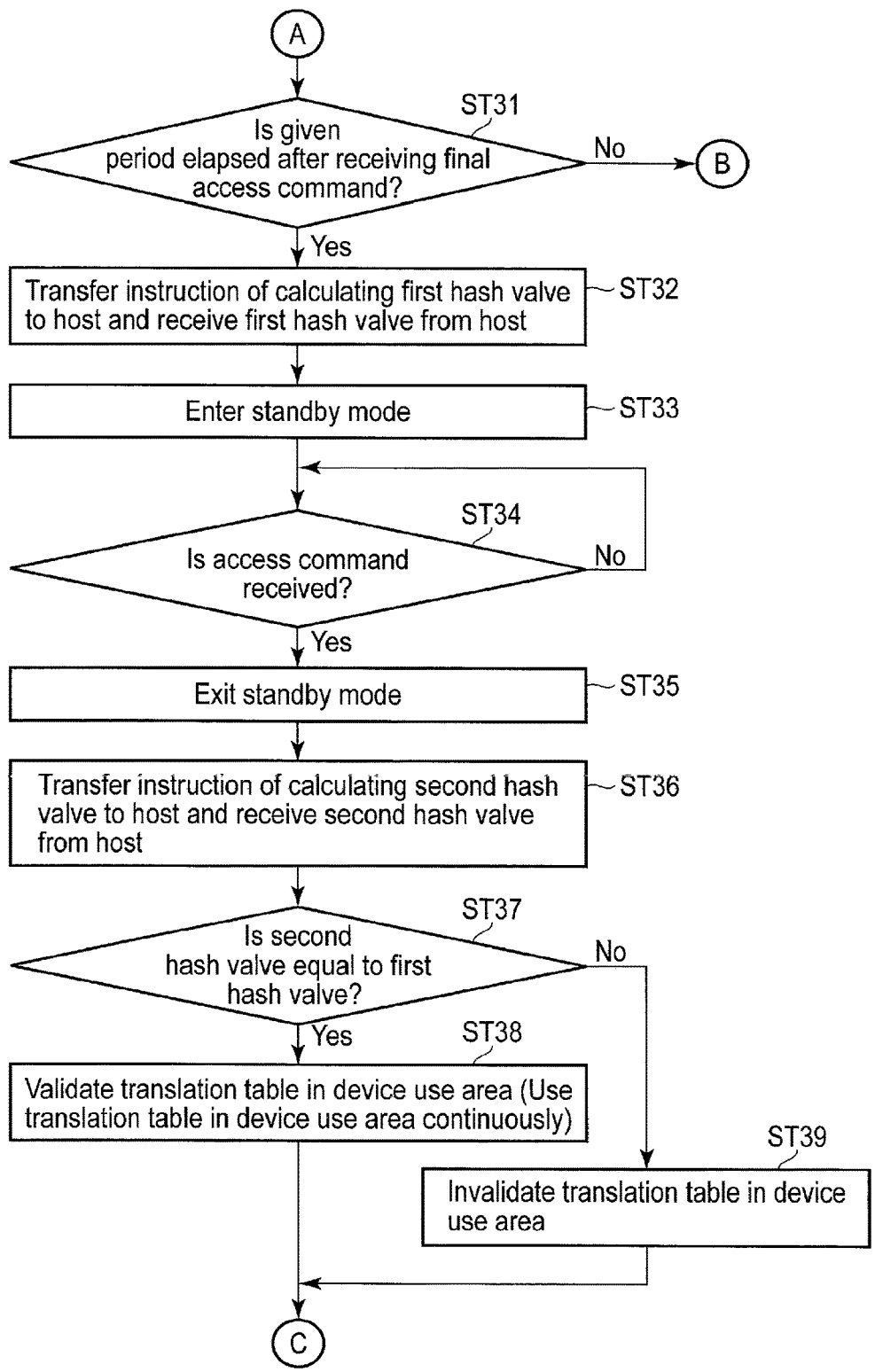

FIG. 5A and FIG. 5B show a second application example. FIG. 6 shows communication between a host and device in the second application example.

The second application example is an example in which a translation table indicating relationships between logical addresses and physical addresses is stored in a device use area in the host, and the storage device instructs the host to calculate hash values, whereby the host calculates the hash values, and further transfers the calculated hash values to the storage device.

The address translation algorithm (steps ST11 to ST15) is identical to the first application example, and hence the explanation thereof is omitted here.

In this address translation algorithm, when no access command is received, the CPU 32 executes a tamper-proof algorithm at predetermined timing.

For example, when a given condition is satisfied, the CPU 32 issues an instruction to calculate a hash value (first hash value) of all or part of the device use area to the host. Upon receipt of this instruction, the host calculates the first hash value, and transfers the first hash value to the storage device. Upon receipt of the first hash value, the storage device stores the first hash value in, for example, a register (steps ST31 to ST32).

Here, the given condition is, similarly to the first application example, that a final access command from the host to the storage device has been received, and thereafter a predetermined period of time has elapsed or that an instruction concerning the standby mode has been received from the host, and so on.

After carrying out storage of the first hash value, the CPU 32 causes the storage device to enter the standby mode (step ST33). In the standby mode, a power supply voltage is supplied to only a minimum necessary number of components. Further, when the storage device has a low power consumption mode changing in multiple steps, the standby mode can also be replaced with one of these multiple steps.

Thereafter, upon receipt of, for example, an access command from the host, the CPU 32 causes the storage device to exit from the standby mode (steps ST34 to ST35).

The CPU 32 also issues an instruction to calculate a hash value (second hash value) of all or part of the device use area in the host to the host. Upon receipt of this instruction, the host calculates the second hash value, and transfers the second hash value to the storage device. Upon receipt of the second hash value, the storage device compares the second hash value with the first hash value (step ST36).

When the first and second hash values are identical to each other, the CPU 32 determines that all or part of the device use area has not been tampered, and certifies that the translation table in the device use area at the time before the storage device has entered the standby mode is valid. In this case, the translation table in the device use area at the time before the storage device has entered the standby mode is continuously used (step ST37→ST38).

On the other hand, when the first and second hash values are different from each other, the CPU 32 determines that all or part of the device use area has been tampered, and invalidates the translation table in the device use area at the time before the storage device has entered the standby mode. In this case, the translation table is read again from the nonvolatile memory into the device use area (step ST37→ST39).

After the above tamper-proof algorithm is executed, the flow returns to the address translation algorithm.

According to the second application example, the hash values calculated by the host are transferred to the storage device, whereby it is possible to verify the tampering of the translation table of the device use area in the host. It should be noted that, similarly to the first application example, when the storage device is a low-end product, it is conceivable that the storage device frequently enters the standby mode. It is remarkably effective to detect tampering of data, and protect the data under such circumstances without an increase in cost.

Figure 7:
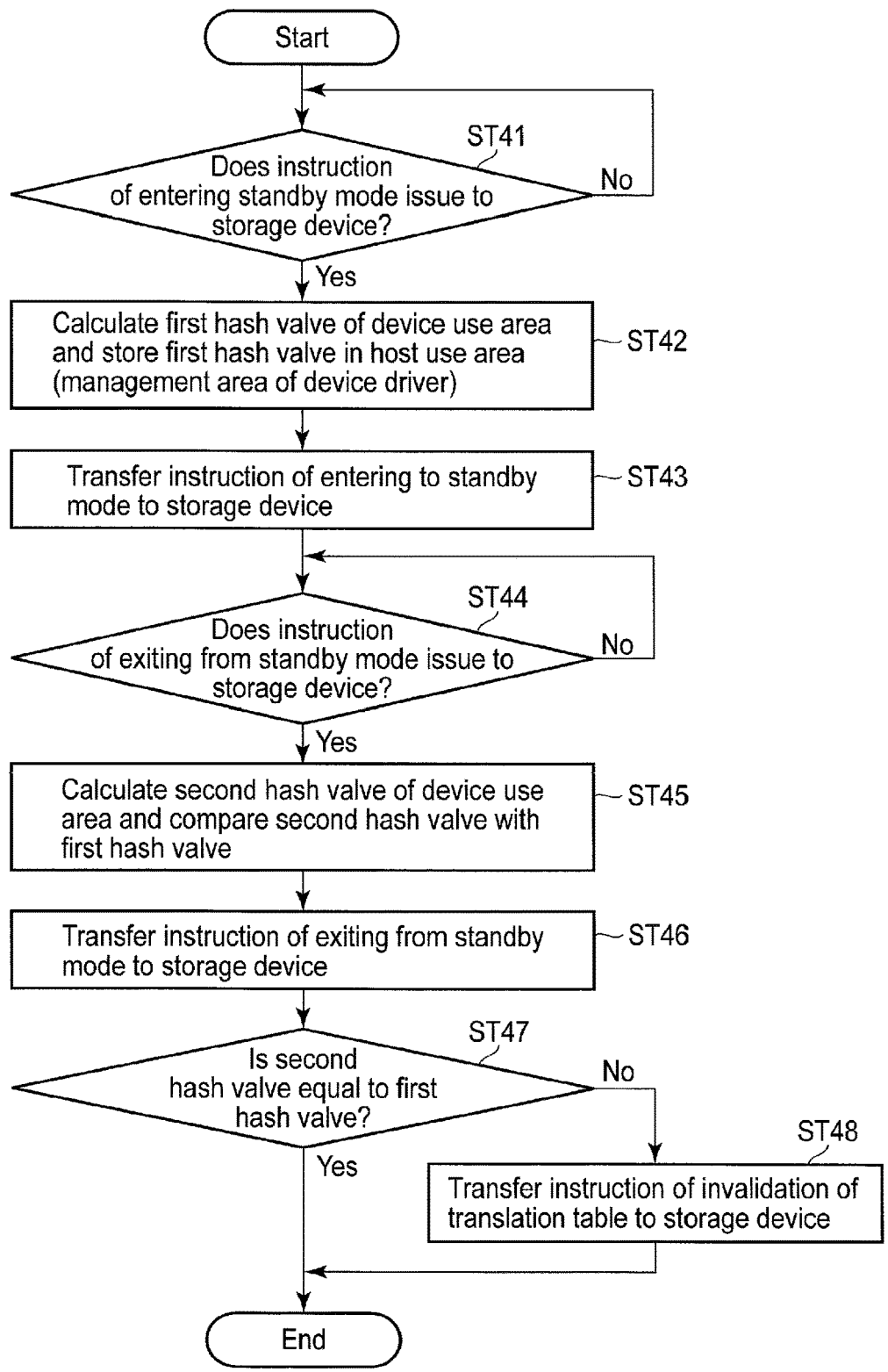
FIG. 7, FIG. 8A, and FIG. 8B are views showing a third application example.
Figure 8A:
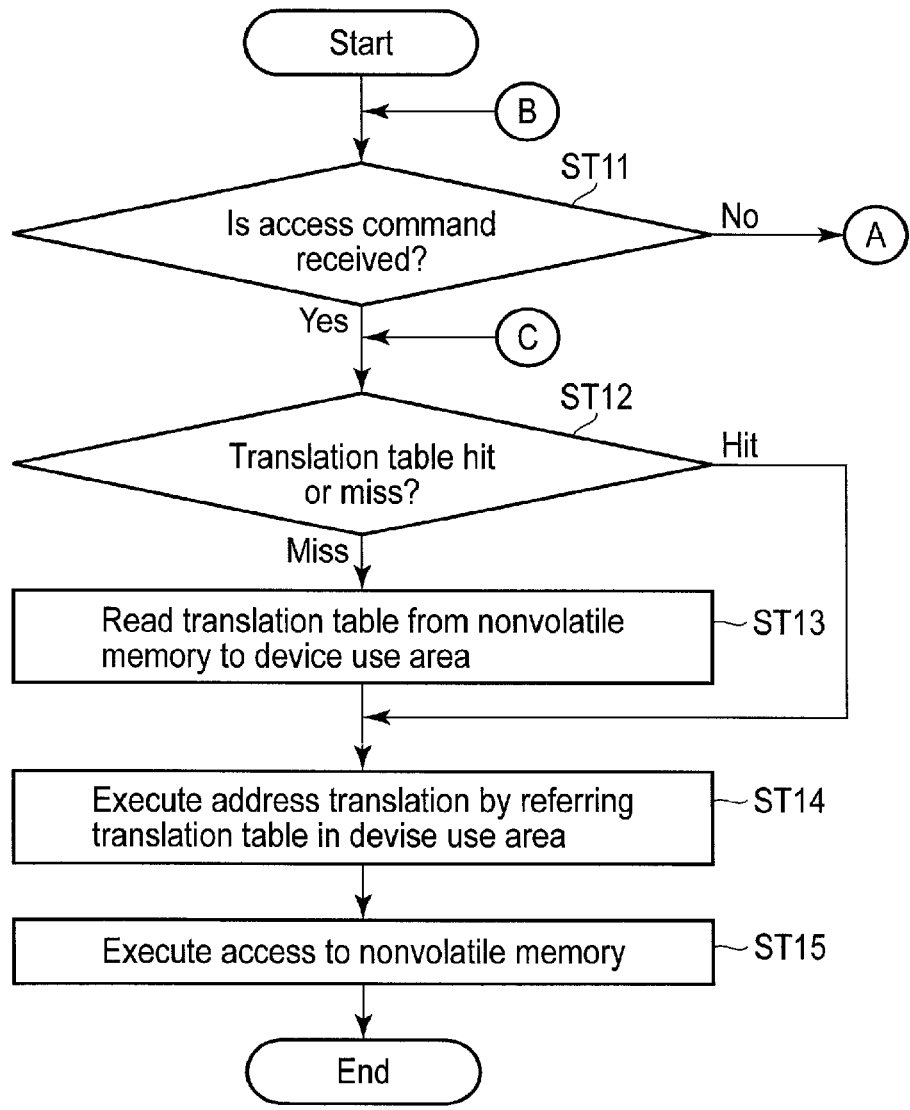
Figure 8B:
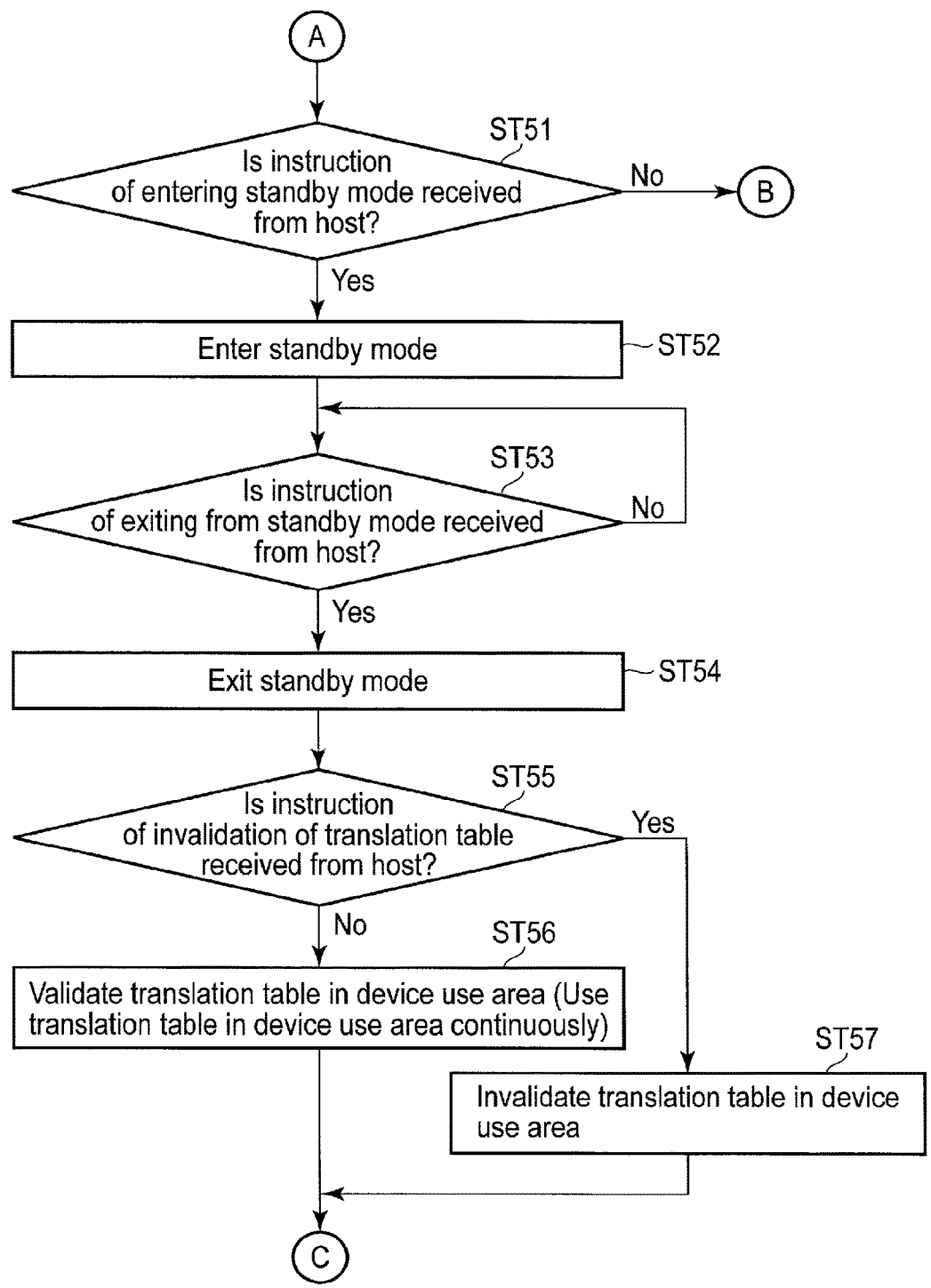

FIG. 7, FIG. 8A, and FIG. 8B show a third application example. FIG. 9 shows communication between the host and device in the third application example.

The third application example is an example in which a translation table indicating relationships between logical addresses and physical addresses is stored in the device use area in the host, the host carries out calculation and storage of hash values and, when the device use area is tampered, information about the tampering is transferred from the host to the storage device.

FIG. 7 shows the operation of the host.

First, when a given condition is satisfied and, for example, when issuing an instruction to enter the standby mode to the storage device, the host calculates a hash value (first hash value) of all or part of the device use area, and stores the first hash value in, for example, a device driver of the host use area (steps ST41 to ST42).

Thereafter, the host transfers an instruction to enter the standby mode to the storage device (step ST43).

Further, when the given condition is satisfied and, for example, when issuing an instruction to exit from the standby mode to the storage device, the host calculates a hash value (second hash value) of all or part of the device use area, and compares the second hash value with the first hash value (steps ST44 to ST45). Further, the host transfers an instruction to exit from the standby mode to the storage device (step ST46).

When the second hash value is different from the first hash value, the host determines that all or part of the device use area has been tampered, and certifies that the translation table in the device use area at the time before the storage device has entered the standby mode is invalid. Further, the host transfers information indicating that the translation table in the device use area is invalid to the storage device (steps ST47 to ST48).

FIG. 8A and FIG. 8B show the operation of the storage device.

The address translation algorithm (steps ST11 to ST15) is identical to the first application example, and hence the explanation thereof is omitted here.

In this address translation algorithm, when no access command is received, the CPU 32 executes a tamper-proof algorithm at predetermined timing.

For example, when a given condition is satisfied and, for example, when receiving an instruction to enter the standby mode from the host, the CPU 32 causes the storage device to enter the standby mode (steps ST51 to ST52).

In the standby mode, a power supply voltage is supplied to only a minimum necessary number of components. Further, when the storage device has a low power consumption mode changing in multiple steps, the standby mode can also be replaced with one of these multiple steps.

Thereafter, when the given condition is satisfied and, for example, when receiving an instruction to exit from the standby mode from the host, the CPU 32 causes the storage device to exit from the standby mode (steps ST53 to ST54).

Further, the CPU 32 confirms whether or not information indicating that the translation table in the device use area is invalid has been received from the host (step ST55).

When no information indicating that the translation table in the device use area is invalid has been received from the host, the CPU 32 determines that all or part of the device use area has not been tampered, and certifies that the translation table in the device use area at the time before the storage device has entered the standby mode is valid. In this case, the translation table in the device use area at the time before the storage device has entered the standby mode is continuously used (step ST55→ST56).

On the other hand, when information indicating that the translation table in the device use area is invalid has been received from the host, the CPU 32 determines that all or part of the device use area has been tampered, and invalidates the translation table in the device use area at the time before the storage device has entered the standby mode. In this case, the translation table is read again from the nonvolatile memory into the device use area (step ST55→ST57).

After the above tamper-proof algorithm is executed, the flow returns to the address translation algorithm.

According to the third application example, the host calculates the hash values, determines whether or not the translation table of the device use area has been tampered and, when tampering has occurred, the host transfers information about the occurrence of the tampering to the storage device. Accordingly, the storage device can verify the tampering of the translation table of the device use area on the basis of the information from the host. It should be noted that, similarly to the first application example, when the storage device is a low-end product, it is conceivable that the storage device frequently enters the standby mode. It is remarkably effective to detect tampering of data, and protect the data under such circumstances without an increase in cost.

CONCLUSION

As has been described above, according to the examples, when the storage device uses part of the memory in the host, it is possible to verify tampering of data stored in part of the memory. Accordingly, when tampering of the data is found, it is possible to protect the data by invalidating the data stored in part of the memory in the host, and reading the data again from the nonvolatile memory.

Further, a storage device conforming to a standard enabling part of the memory in the host to be used is a low-end product giving priority to cost reduction. In such a product, it is possible to effectively determine whether or not tampering has occurred in the standby mode without an increase in cost by managing hash values. That is, it is possible to realize, at low cost, a storage device conforming to a standard enabling part of the memory in the host to be used.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage device which is connectable to a host, the storage device comprising:

a nonvolatile memory storing first data; and a device controller which is capable of storing all or a part of the first data stored in the nonvolatile memory as second data to a memory area in the host, wherein the device controller is configured to:

calculate a first hash value of the second data stored in the memory area in a first timing, wherein the first timing corresponds to the storage device entering a standby mode, calculate a second hash value of the second data stored in the memory area in a second timing, wherein the second timing corresponds to the storage device exiting the standby mode, and detect whether the second data stored in the memory area is tampered between the first and second timings by comparing the second hash value with the first hash value.

2. The storage device of claim 1, wherein
the device controller determines that the second data is not tampered when the second hash value is equal to the first hash value, and determines that the second data stored in the memory area is valid.

3. The storage device of claim 1, wherein
the device controller determines that the second data is tampered when the second hash value is different from the first hash value, and determines that the second data stored in the memory area is invalid.

4. The storage device of claim 3, wherein
the device controller is capable of storing all or a part of the first data stored in the nonvolatile memory as the second data to the memory area again when the device controller determines that the second data stored in the memory area is invalid.

5. The storage device of claim 1, wherein
the first data is a first translation table showing a relationship between a logical address and a physical address, the second data is a second translation table as all or a part of the first translation table, and the device controller detects whether the second translation table is tampered between the first and second timings by comparing the second hash value with the first hash value.

6. The storage device of claim 1, wherein
the device controller is entered the storage device to the standby mode when a given period elapses after receiving a final access command from the host, and is exited the storage device from the standby mode when a new access command receives from the host.

7. The storage device of claim 1, wherein
the device controller is entered the storage device to the standby mode on the basis of an instruction from the host, and is exited the storage device from the standby mode on the basis of an instruction from the host.

8. The storage device of claim 1, wherein
the device controller comprises a register storing the first hash value, and the register is operated in the standby mode.

9. The storage system of claim 5, wherein the device controller comprises a memory storing tag information which manages the second translation table, and determines whether a translation from the logical address to the physical address using the second translation table is possible by referring the tag information.

10. A storage device which is connectable to a host, the storage device comprising:
a nonvolatile memory storing first data; and
a device controller which is capable of storing all or a part of the first data stored in the nonvolatile memory as second data to a memory area in the host, wherein the device controller is configured to:

indicate to the host so that the host calculates a first hash value of the second data stored in the memory area in a first timing, wherein the first timing corresponds to the storage device entering a standby mode, indicate to the host so that the host calculates a second hash value of the second data stored in the memory area in a second timing, wherein the second timing corresponds to the storage device exiting the standby mode, and detect whether the second data stored in the memory area is tampered between the first and second timings by comparing the second hash value with the first hash value.

11. The storage device of claim 10, wherein
the first and second hash values are transferred from the host to the device controller in a given timing.

12. The storage device of claim 10, wherein
the device controller determines that the second data is not tampered when the second hash value is equal to the first hash value, and determines that the second data stored in the memory area is valid.

13. The storage device of claim 10, wherein
the device controller determines that the second data is tampered when the second hash value is different from the first hash value, and determines that the second data stored in the memory area is invalid.

14. The storage device of claim 10, wherein
the first data is a first translation table showing a relationship between a logical address and a physical address, the second data is a second translation table as all or a part of the first translation table, and the device controller detects whether the second translation table is tampered between the first and second timings by comparing the second hash value with the first hash value.

15. A storage system comprising:
a host; and
a storage device which is connectable to the host,
wherein the storage device comprises:
a nonvolatile memory storing first data; and
a device controller which is capable of storing all or a part of the first data stored in the nonvolatile memory as second data to a memory area in the host, wherein the host is configured to:

calculate a first hash value of the second data stored in the memory area in a first timing, wherein the first timing corresponds to the storage device entering a standby mode, calculate a second hash value of the second data stored in the memory area in a second timing, wherein the second timing corresponds to the storage device exiting the standby mode, and detect whether the second data stored in the memory area is tampered between the first and second timings by comparing the second hash value with the first hash value.

16. The storage system of claim 15, wherein
the host determines that the second data is not tampered when the second hash value is equal to the first hash value, and instructs an information showing that the second data stored in the memory area is valid to the device controller.

17. The storage system of claim 15, wherein
the host determines that the second data is tampered when the second hash value is different from the first hash value, and instructs an information showing that the second data stored in the memory area is invalid to the device controller.

18. The storage system of claim 15, wherein
the first data is a first translation table showing a relationship between a logical address and a physical address, the second data is a second translation table as all or a part of the first translation table, and the host detects whether the second translation table is tampered between the first and second timings by comparing the second hash value with the first hash value.

19. The storage system of claim 15, wherein the host comprises a device driver storing the first hash value.

20. The storage system of claim 19, wherein
the memory area includes a host use area and a device use area, and
the host use area is a management area of the device driver.

\* \* \* \* \*